(12) United States Patent
Franconi et al.

(10) Patent No.: US 9,080,687 B2
(45) Date of Patent: Jul. 14, 2015

(54) PRESSURE AND FLOW ALTITUDE COMPENSATED SHUTOFF VALVE

(75) Inventors: Robert Franconi, New Hartford, CT (US); Paul Banta, Avondale, AZ (US); Cecilia Sum Lam, Scottsdale, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 553 days.

(21) Appl. No.: 13/479,889

(22) Filed: May 24, 2012

(65) Prior Publication Data

US 2013/0312843 A1  Nov. 28, 2013

(51) Int. Cl.
| | |
|---|---|
| F16K 17/36 | (2006.01) |
| F16K 31/122 | (2006.01) |
| F16K 31/124 | (2006.01) |
| F16K 1/12 | (2006.01) |
| F01D 25/18 | (2006.01) |

(52) U.S. Cl.
CPC ............ F16K 31/1223 (2013.01); F16K 1/126 (2013.01); F16K 31/1221 (2013.01); F16K 31/1245 (2013.01); F01D 25/18 (2013.01)

(58) Field of Classification Search
CPC . F16K 31/1223; F16K 1/126; F16K 31/1245; F16K 31/1221; F01D 25/18
USPC ............ 137/78.5, 81.1, 488, 505.13, 505.15, 137/505.18; 251/28, 60, 82, 83, 284
See application file for complete search history.

(56) References Cited

U.S. PATENT DOCUMENTS

| | | | |
|---|---|---|---|
| 2,307,838 A | * | 1/1943 | Jacobsson .................... 137/81.1 |
| 2,466,582 A | | 4/1949 | Dillman |
| 2,592,830 A | | 4/1952 | Sneller |
| 2,669,094 A | | 2/1954 | Lee, II |
| 2,674,847 A | * | 4/1954 | Davies et al. .............. 60/39.281 |
| 2,705,046 A | | 3/1955 | Schroeder |
| 3,011,770 A | * | 12/1961 | Stoltman ...................... 261/39.2 |
| 3,366,315 A | | 1/1968 | Alberani |
| 3,545,465 A | * | 12/1970 | Zadoo ............................. 137/38 |
| 3,572,356 A | | 3/1971 | Pinto |
| 3,752,175 A | | 8/1973 | Hamilton et al. |

(Continued)

FOREIGN PATENT DOCUMENTS

| | | |
|---|---|---|
| GB | 793452 | 4/1958 |
| GB | 1327828 | 8/1973 |

OTHER PUBLICATIONS

United Turbine—Troubleshooting; http://www.unitedturbine.com/troubleshooting.html. Copyright. 2011.

*Primary Examiner* — Craig Schneider
*Assistant Examiner* — Frederick D Soski
(74) *Attorney, Agent, or Firm* — Ingrassia Fisher & Lorenz, P.C.

(57) ABSTRACT

A pressure and flow altitude compensated shut off valve includes a valve body, a valve element, and an altitude compensation pilot valve. The valve body has an inlet port, an outlet port, and a flow passage extending between the inlet port and the outlet port. The valve element is disposed within the flow passage and is responsive to fluid pressure at the inlet port to move between a closed position, in which fluid may not flow through the flow passage, and a plurality of open positions between the closed position and a full-open position. The altitude compensation pilot valve is coupled to the valve body and is responsive to pressure variations at the second port to control the fluid pressure at which the valve element moves to the closed and open positions.

18 Claims, 5 Drawing Sheets

(56) References Cited

U.S. PATENT DOCUMENTS

| | | |
|---|---|---|
| 3,768,466 A | 10/1973 | Johnson |
| 3,777,480 A * | 12/1973 | Stoltman ............ 60/39.281 |
| 4,177,224 A | 12/1979 | Yamanaka et al. |
| 4,183,372 A * | 1/1980 | Ueda et al. ............ 137/81.1 |
| 4,223,534 A | 9/1980 | Annus |
| 4,251,985 A | 2/1981 | Sullivan |
| 4,332,268 A | 6/1982 | Yoshimura et al. |
| 4,344,285 A | 8/1982 | Ridge |
| 4,472,321 A | 9/1984 | Kamohara et al. |
| 4,476,682 A | 10/1984 | McInerney |
| 4,619,286 A | 10/1986 | Caldwell |
| 4,991,392 A | 2/1991 | Goldberg et al. |
| 5,035,260 A * | 7/1991 | Davey ............ 137/505.18 |
| 5,133,386 A | 7/1992 | Magee |
| 6,367,241 B1 | 4/2002 | Ress, Jr. et al. |
| 2008/0196773 A1* | 8/2008 | Franconi ............ 137/492.5 |
| 2008/0264494 A1* | 10/2008 | Nambu ............ 137/81.1 |
| 2009/0078506 A1 | 3/2009 | Franconi |
| 2010/0143094 A1 | 6/2010 | Pisseloup et al. |

* cited by examiner

US 9,080,687 B2

PRESSURE AND FLOW ALTITUDE COMPENSATED SHUTOFF VALVE

TECHNICAL FIELD

The present invention generally relates to a shutoff valve, and more particularly relates to a pressure and flow altitude compensated shut off valve.

BACKGROUND

An aircraft gas turbine engine is typically equipped with a bearing lubrication system that supplies lubricant to various bearings that support rotating shafts. After flowing over the bearings, the oil collects in a sump provided at the bottom of the bearing housing. The oil may then flow from the sump into an oil tank, which holds a large reservoir of oil. Under the influence of a supply pump, the oil may then be drawn from the oil tank and supplied to the spray bar, which again directs the oil over the bearings. This cycle is continually repeated to maintain the bearings at a proper lubrication and operating temperature.

In some gas turbine engines, a bearing cavity exists within the bearing housing above the sump. In some of these same engines, it may be desirable to de-pressurize the bearing cavity to ensure certain seals remain energized, and thus prevent lubricant loss into the turbine gas path. It has been found, however, that in some systems, such de-pressurization is not needed at all operating conditions and at various altitudes above sea level. Such functionality could be implemented actively, but it could be potentially costly and complex.

Hence, there is a need for a passive device that will allow the engine bearing cavity of an aircraft gas turbine engine to be de-pressurized at relatively high throttle positions, while not de-pressurizing the cavity at relatively cruise positions and/or compensating for altitude variations. The present invention addresses at least this need.

BRIEF SUMMARY

In one embodiment, a valve includes a valve body, a valve element, and an altitude compensation pilot valve. The valve body has an inlet port, an outlet port, and a flow passage extending between the inlet port and the outlet port. The valve element is disposed within the flow passage and is responsive to fluid pressure at the inlet port to move between a closed position, in which fluid may not flow through the flow passage, and a plurality of open position between the closed position and a full-open position. The altitude compensation pilot valve is coupled to the valve body and includes at least a first port and a second port. The first port is in fluid communication with the inlet port, and the second port is adapted to be in fluid communication with a reference pressure source. The altitude compensation pilot valve is responsive to pressure variations at the second port to control the fluid pressure at which the valve element moves to the closed and open positions.

In another embodiment, a valve includes a valve body, a valve element, an altitude compensation pilot valve, and a stroke limiter. The valve body has an inlet port, an outlet port, and a flow passage extending between the inlet port and the outlet port. The valve element is disposed within the flow passage and is responsive to fluid pressure at the inlet port to move between a closed position, in which fluid may not flow through the flow passage, and a plurality of open position between the closed position and a full-open position. The altitude compensation pilot valve is coupled to the valve body and includes at least a first port and a second port. The first port is in fluid communication with the inlet port, and the second port adapted to be in fluid communication with a reference pressure source. The altitude compensation pilot valve is responsive to pressure variations at the second port to control the fluid pressure at which the valve element moves to the closed and open positions. The stroke limiter is coupled to the valve body and responsive to pressure variations of the reference pressure source to control the full-open position of the valve element.

In yet another embodiment, a valve includes a valve body, a valve element, a spring element, an altitude compensator bellows, and a stroke limiter bellows. The valve body has an inlet port, an outlet port, and a flow passage extending between the inlet port and the outlet port. The valve element is disposed within the flow passage and is responsive to fluid pressure at the inlet port to move between a closed position, in which fluid may not flow through the flow passage, and a plurality of open position between the closed position and a full-open position. The spring element engages the valve body and the valve element and supplies a bias force to the valve element that biases the valve element toward the full-open position. The altitude compensator bellows is coupled to the valve body and the valve element and is configured, in response to ambient pressure, to vary the fluid pressure at which the valve element moves to the closed and open positions. The stroke limiter bellows is coupled to the valve body and is configured, in response to ambient pressure, to vary the full-open position of the valve element.

Furthermore, other desirable features and characteristics of the pressure and flow altitude compensated shut off valve will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
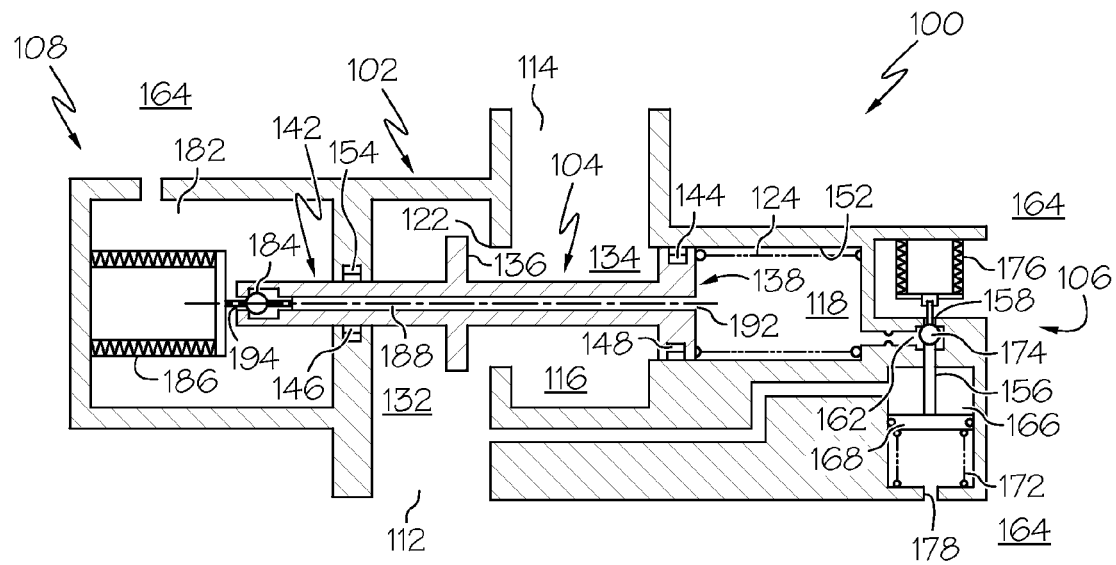
FIG. 1 depicts a simplified cross section view of an embodiment of a pressure and flow altitude compensated shut off valve in a full-open position.

A simplified cross section view of an embodiment of a pressure and flow altitude compensated shut off valve 100 is depicted in FIG. 1, and includes a valve body 102, a valve element 104, an altitude compensation pilot valve 106, and a stroke limiter 108. The valve body 102 includes an inlet port 112, an outlet port 114, and a flow passage 116 that extends between the inlet port 112 and the outlet port 114. The depicted valve body 102 additionally has a main piston cavity 118 formed therein, and further includes a valve seat 122. The valve seat 122 extends into the flow passage 116 and divides the flow passage 116 into an inlet cavity 132 and an outlet cavity 134. A main spring element 124 is disposed within the main piston cavity 118 and supplies a bias force to the valve element 104 that biases the valve element 104 toward its full-open position. It will be appreciated that in some embodiments, the valve 100 may be implemented without the main spring element 124 or with a spring that bias the valve closed.

Figure 2:
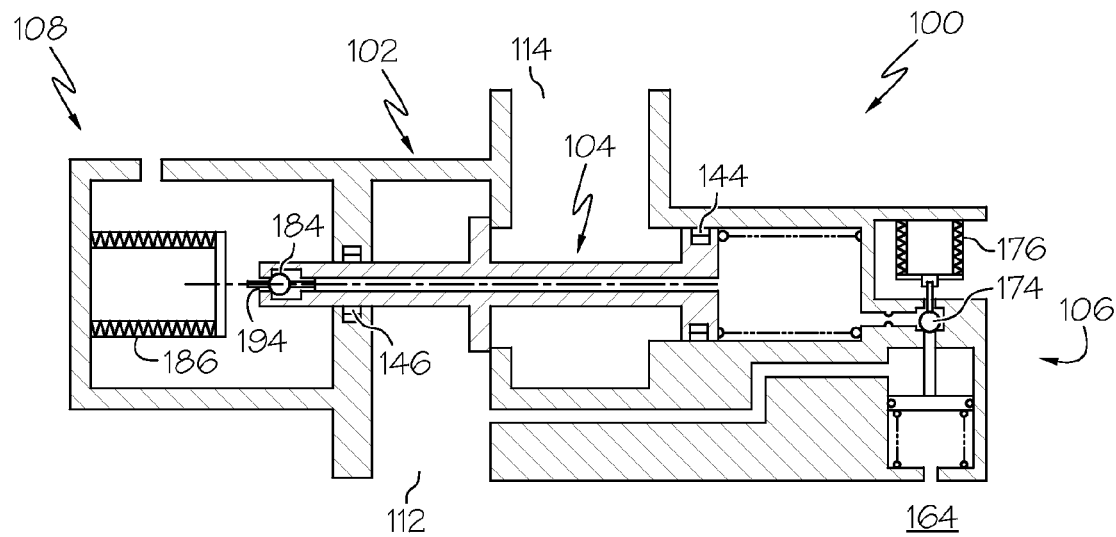
FIG. 2 depicts the valve of FIG. 1 in a closed position.

The valve element 104 is disposed within the flow passage 116 and is responsive to fluid pressure at the inlet port 112 to move between a closed position and a plurality of open positions between the closed position and a full-open position. In the closed position, which is depicted in FIG. 2, fluid may not flow through the flow passage 116. Conversely, in an open position, such as the position depicted in FIG. 1, fluid may flow through the flow passage 116. The depicted valve element 104 includes an annular seating surface 136, which engages the valve seat 122 when the valve element is in the closed position. The valve element 104 additionally includes a first portion 138 and a second portion 142.

As FIG. 1 further depicts, a primary seal 144 is coupled to the first portion 138 of the valve element 104, and a secondary seal 146 is coupled to the second portion 142 of the valve element 104. The primary seal 144 is disposed within and engages the main piston cavity 118. More specifically, at least in the depicted embodiment, the primary seal 144 is disposed within a groove 148 that is formed in the first portion 138 of the valve element 104, and engages a surface 152 in the valve body 102 that defines the main piston cavity 118. The secondary seal 146 surrounds the second portion 142 of the valve element 104, and is disposed within a secondary seal retainer 154. The secondary seal retainer 154 is formed in the valve body 104 and is spaced apart from the main piston cavity 118.

The valve element 104 is further configured such that the annular seating surface 136 and the first portion 138 of the valve element 104 each have a first diameter, and the second portion 142 of the valve element 104 has a second diameter that is less than the first diameter. Though the particular difference in diameter may vary, in a particular preferred embodiment, the second diameter is about one-half of the first diameter. This area difference allows a portion of the fluid force applied to the first portion 138 of the valve element 104 to be referenced to a reference pressure source 164 during operation. It should be noted that the first portion 138 of the valve element 104 is configured as a piston. Moreover, the second portion 142 of the valve element 104, at least in the depicted embodiment, is configured as a shaft that may be used as a visual position indicator.

The altitude compensation pilot valve 106 is coupled to the valve body 102 and, in the depicted embodiment, includes a first port 156, a second port 158, and a third port 162. The first port 156 is in fluid communication with the inlet port 112, the second port 158 is adapted to be in fluid communication with the reference pressure source 164, such as the surrounding ambient environment, and the third port 162 is in fluid communication with the main piston cavity 118. The altitude compensation pilot valve 106 is responsive to pressure variations at the second port 158 to control the fluid pressure at which the valve element 104 moves to the closed and open positions. The altitude compensation pilot valve 106 is additionally responsive to pressure variations at the first port 156 to selectively place the main piston cavity 118 in fluid communication with either the inlet port 112 or the second port 158.

The altitude compensation pilot valve 106 may be variously configured to implement the above-described functionality, but in the depicted embodiment it additionally includes a compensation piston cavity 166, a compensation piston 168, a compensation spring 172, a pilot valve element 174, and an evacuated bellows 176. The compensation piston cavity 166 is formed in the valve body 102 and is in fluid communication with both the first port 156 and the inlet port 112. The compensation piston cavity 166 additionally includes a fourth port 178 that is adapted to be in fluid communication with the reference pressure source 164.

The compensation piston 168 and the compensation spring 172 are both disposed within the compensation piston cavity 166. The compensation piston 168 is movable within the compensation piston cavity 166 in response to a difference in fluid pressure across the compensation piston 168. The compensation spring element 172 supplies a bias force to the compensation piston 168.

The pilot valve element 174 is coupled to the compensation piston 168 and is movable therewith between an equalization position and a vent position. In the equalization position, which is the position depicted in FIG. 1, the third port 162 is in fluid communication with the first port 156 and is fluidly isolated from the second port 158. In the vent position, which is the position depicted in FIG. 2, the third port 162 is in fluid communication with the second port 158 and is fluidly isolated from the first port 156. Because the pilot valve element 174 is coupled to the compensation piston 168, it is biased toward the equalization position via the bias force that the compensation spring element 172 supplies to the compensation piston 168. It will be appreciated that the pilot valve element 174 may be implemented as poppet or ball element.

The evacuated bellows 176 is coupled to the valve body 102 and is responsive to pressure variations of the reference pressure source 164 to selectively move the pilot valve element 174 between the equalization and vent positions. As will be described further below, the responsiveness of the evacuated bellows 176 to variations of the reference pressure source 164 varies the pressure at which the valve element 104 moves to the closed position.

The stroke limiter 108 is coupled to the valve body 102 and is responsive to pressure variations of the reference pressure source 164 to control the full-open position of the valve element 104. To implement this functionality, the depicted stroke limiter 108 is disposed within a stroke limiter cavity 182, and includes a stroke limiting relief valve 184, and an evacuated bellows 186. The stroke limiter cavity 182 is formed in the valve body 102 and, in addition to having the stroke limiter 108 disposed therein, has at least part of the second portion 142 of the valve element 104 disposed therein. The stroke limiter cavity 182 is additionally in fluid communication with the reference pressure source 164.

The stroke limiting relief valve 184 is disposed within a channel 188 that is formed in, and extends through, the valve element 104. The channel 188 includes a first port 192 that is in fluid communication with the main piston cavity 118, and a second port 194 that is in fluid communication with the stroke limiter cavity 182. The stroke limiting relief valve 184 is movable within the channel 188 between a first position and a second position. In the first position, which is the position depicted in FIG. 1, the stroke limiter cavity 182 is fluidly isolated from the main piston cavity 118. In the second position, which is the position depicted in FIG. 3, the stroke limiter cavity 182 is in fluid communication with the main piston cavity 118 via the channel 188.

The stroke limiter evacuated bellows 186, like the altitude compensation pilot evacuated bellows 176, is responsive to pressure variations of the reference pressure source 164. The stroke limiter evacuated bellows 186, however, is responsive to these pressure variations to selectively move the stroke limiting relief valve 184 between the first and second positions. As will be described in more detail further below, this is the mechanism whereby the stroke limiter 108 controls the full-open position of the valve element 104.

Having described the pressure and flow altitude compensated shut off valve 100 from a structural standpoint, and generally described its functionality, a more detailed description of its operation will now be provided. As noted above, the valve 100 is preferably configured so that the valve element 104 is in the full-open position, which is the position depicted in FIG. 1, when the valve 100 is unpressurized. Thus, when fluid from a fluid pressure source, such as a turbine engine compressor stage, initially enters the inlet port 112, the fluid passes into and through the flow passage 116, and exits via the outlet port 114. Additionally, the altitude compensation pilot valve 106, due to the bias force supplied to the compensation piston 168 by the compensation spring 172, is configured so that the main piston cavity 118 is in fluid communication with the inlet port 112. That is, the pilot valve element 174 is in the equalization position so that the third port 162 is fluidly isolated from the second port 158, but is in fluid communication with the inlet port 112 via the first port 156 and the compensation cavity 166. Thus, fluid pressure in the main piston cavity 118 is equal to fluid pressure at the inlet port 112, and assists the main spring element 124 in biasing the valve element 104 to the full-open position.

Figure 3:
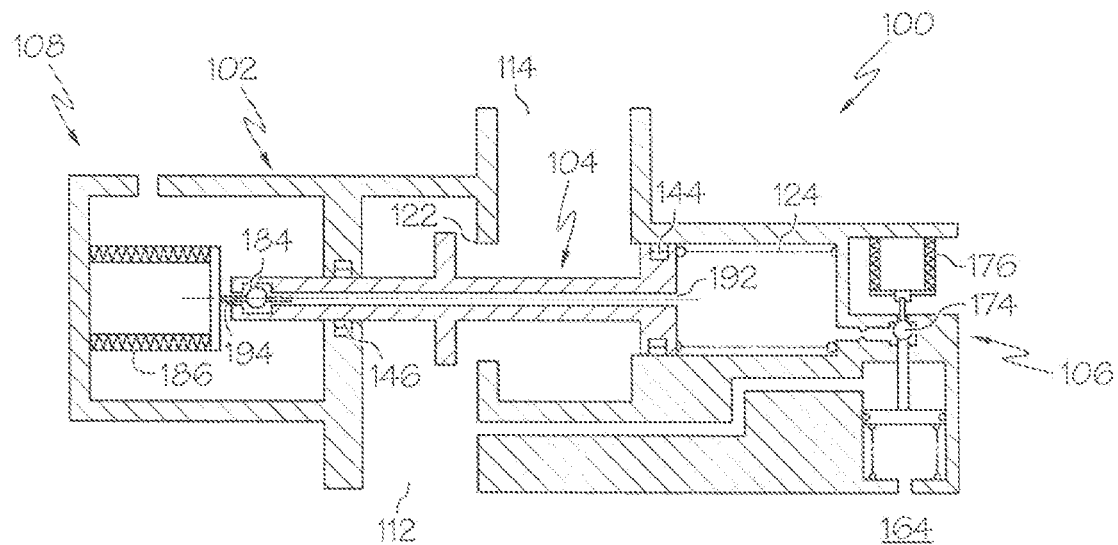
FIG. 3 depicts the valve of FIG. 1 while implementing a stroke limiter feature.

As fluid pressure at the inlet port 112 increases, a net fluid pressure force will begin acting on the valve element 104 in the direction of its closed position (e.g., to the right in FIGS. 1-3). The increasing fluid pressure at the inlet port 112 will also cause a fluid pressure force to begin acting on the compensation piston 168 in opposition to the bias force supplied by the compensation spring 172. When the fluid pressure force on the compensation piston 168 exceeds the bias force supplied by the compensation spring 172, the compensation piston 168 will move against the compensation spring 172, and cause the pilot valve element 174 to move to the vent position. In this position, the main piston cavity 118 is in fluid communication with the reference pressure source (e.g., the ambient environment) 164, and is fluidly isolated from the inlet port 112.

Now, when the net fluid pressure force on the valve element 104 exceeds the combined force supplied by the main spring element 124 and the fluid pressure in the main piston cavity 118, the valve element 104 will begin moving toward the closed position. If the fluid pressure at the inlet port 112 increases to a sufficient level, the valve element 104 will move to the closed position, in which the annular seating surface 136 engages the valve seat 122, and prevent flow through the flow passage 116. When fluid pressure at the inlet port 112 subsequently decreases, the valve element 104 will return to the full-open position over an operating pressure range similar to that which moves it from the full-open to the closed position, minus any hysteresis and friction effects. The valve 100 is not influenced by fluid pressure at the outlet port 114 because, as noted above, the annular seating surface 136 and the first portion 138 of the valve element 104 have equal diameters.

It was also noted above that the altitude compensation valve 106 is responsive to pressure variations at the second port 158 to control the fluid pressure at which the valve element 104 moves to the closed and open positions. Because the second port 158 is in fluid communication with the reference pressure source 164, which is preferably the ambient environment, the fluid pressure at the second port 158 will vary with changes in altitude. In particular, if there is an increase in altitude, the fluid pressure at the second port 158 will decrease. As a result, the evacuated bellows 176 will expand and supply a force to the compensation piston 168 that opposes the bias force supplied by the compensation spring 172. This additional force assists the fluid pressure at the inlet port 112 and compensation cavity 166, resulting in a reduction in the fluid pressure required to move the pilot valve element 174, which results in valve element 104 translation to the closed position, which is the position depicted in FIG. 2. This is because the main piston cavity 118 is fluidly isolated from the fluid pressure at the inlet port 112, and is vented to the reference pressure source 164.

The stroke limiter 108, as noted above, controls the full-open position of the valve element 104, and does so in response to pressure variations of the reference pressure source 164. Thus, as with the altitude compensation pilot valve 106, the stroke limiter 108 is also responsive to altitude variations. In particular, at sea level, the stroke limiter evacuated bellows 186 is compressed by atmospheric pressure and is configured so that it does not interact with the stroke limiting relief valve 184 when the valve element 104 is in the full-open position. As depicted in FIG. 1, this means the stroke limiting relief valve 184 is in the first position, and thus the stroke limiter cavity 182 is fluidly isolated from the main piston cavity 118.

Again as altitude increases, the fluid pressure in the stroke limiter cavity 182 decreases, and the stroke limiter evacuated bellows 186 expands. As the stroke limiter evacuated bellows 186 expands, it engages the stroke limiting relief valve 184 and moves it to the second position. As noted above, and as depicted in FIG. 3, in the second position, the stroke limiter cavity 182 is in fluid communication with the main piston cavity 118, thus venting the main piston cavity 118. In response, the valve element 104 will move toward the closed position until a force balance is achieved. As altitude continues to increase, the stroke limiter evacuated bellows 186 will continue to expand and the full stroke of the valve element 104 will continue to be restricted.

Figure 4:
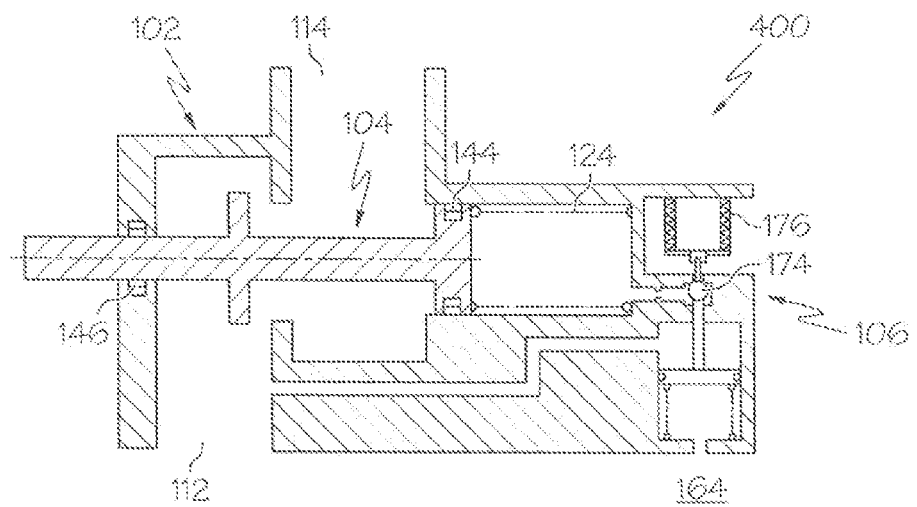
FIGS. 4-7 depict alternative embodiments of a pressure and flow altitude compensated shut off valve.

The pressure and flow altitude compensated shut off valve 100 depicted in FIGS. 1-3 and described above is merely exemplary of one configuration. For example, as depicted in FIG. 4, an alternative pressure and flow altitude compensated shut off valve 400 could be implemented without the stroke limiter 108. This alternative pressure and flow altitude compensated shut off valve 400 would operate substantially identical to the embodiment depicted in FIGS. 1-3, but would not implement the stroke limiting function.

Figure 5:
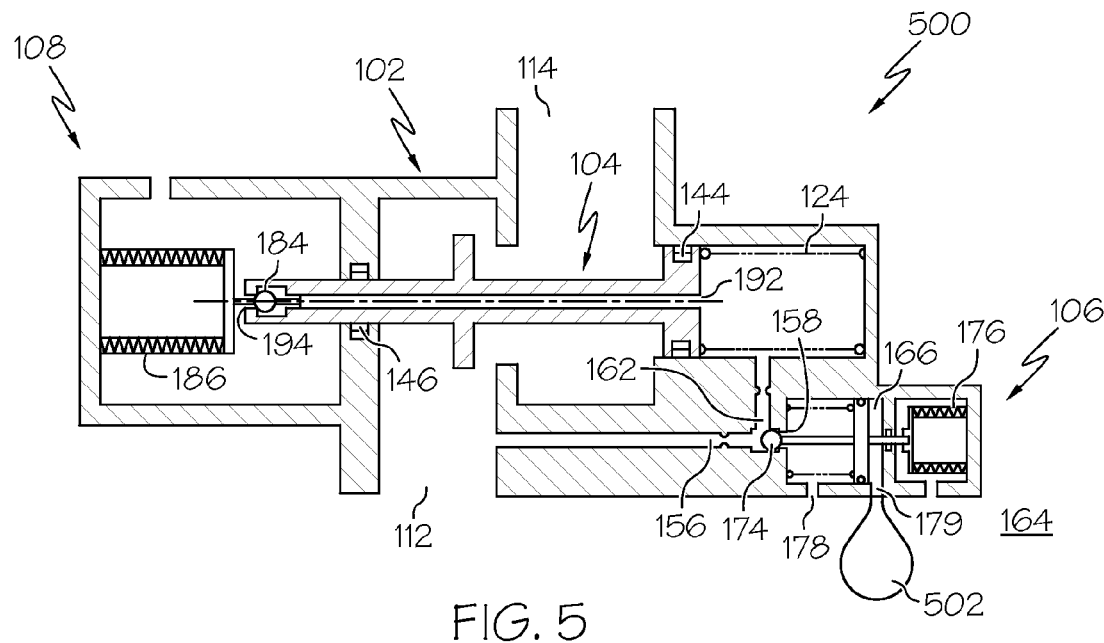

Another alternative embodiment is depicted in FIG. 5. This alternative pressure and flow altitude compensated shut off valve 500 would also operate substantially identical to the embodiment depicted in FIGS. 1-3, including the stroke limiting function; however, the altitude compensation pilot valve 106 is configured somewhat differently. In particular, the compensation cavity 166 is not only in continuous fluid communication with the reference pressure source 164 via the fourth port 178, it is in continuous fluid communication with a remote pressure source 502 via the fifth pressure port 179 and is selectively placed in fluid communication with either the inlet port 112 or the main piston cavity 118 via the pilot valve element 174. The remote pressure source 502 may be, for example, a gas turbine compressor stage that is upstream from the one supplying fluid to the inlet port 112.

Normally, the pilot valve element 174 is in the equalization position, which is the position depicted in FIG. 5, and thus the third port 162 is in fluid communication with the first port 156 and is fluidly isolated from the second port 158. If the fluid pressure of the remote pressure source 502 increases, a fluid pressure force will begin acting on the compensation piston 168 in opposition to the bias force supplied by the compensation spring 172. When the fluid pressure force on the compensation piston 168 exceeds the bias force supplied by the compensation spring 172, the compensation piston 168 will move against the compensation spring 172, and cause the pilot valve element 174 to move to the vent position. In this position, the main piston cavity 118 is in fluid communication with the reference pressure source (e.g., the ambient environment) 164, and is fluidly isolated from the inlet port 112.

Similar to the embodiments depicted in FIGS. 1-4, if there is an increase in altitude, the evacuated bellows 176 will expand and supply a force to the compensation piston 168 in opposition to the bias force supplied by the compensation spring 172. This additional force assists the fluid pressure of the remote pressure source 502, resulting in a reduction in the fluid pressure required to move the valve element 104 to the closed position.

Figure 6:
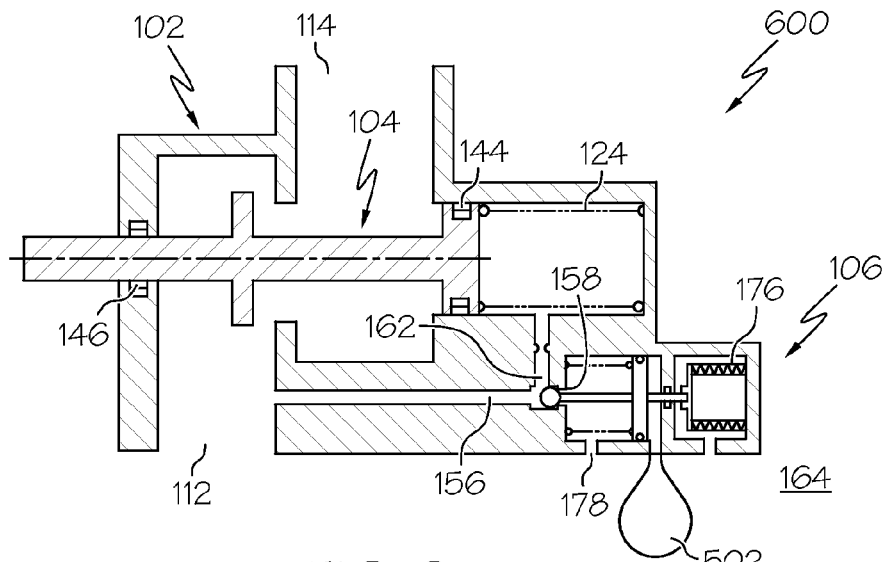

Another alternative pressure and flow altitude compensated shut off valve 600 is depicted in FIG. 6. This alternative pressure and flow altitude compensated shut off valve 600 operates substantially identical to the embodiment depicted in FIG. 5, but does not implement the stroke limiting function.

Figure 7:
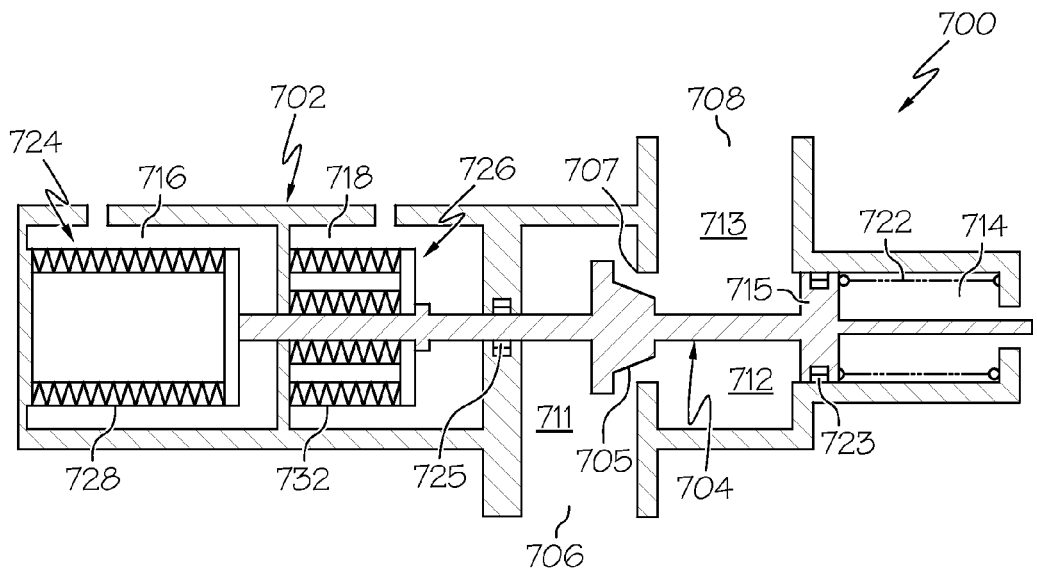

Yet another alternative pressure and flow altitude compensated shut off valve 700 is depicted in FIG. 7. This alternative pressure and flow altitude compensated shut off valve 700 is structurally different from those depicted in FIGS. 1-6, and will thus be described in a bit more detail. Like the other embodiments, the depicted pressure and flow altitude compensated shut off valve 700 includes a valve body 702 and a valve element 704. The valve body 702 has an inlet port 706, an outlet port 708, and a flow passage 712 extending between the inlet port 706 and the outlet port 708. A valve seat 707 extends into the flow passage 712 and divides the flow passage 712 into an inlet cavity 711 and an outlet cavity 713.

The valve element 704 is disposed within the flow passage 712 and is responsive to fluid pressure at the inlet port 706 to move between a closed position and a plurality of open position between the closed position and a full-open position. In the closed position, fluid may not flow through the flow passage 712. In an open position, fluid may flow through the flow passage 712. The valve element 704 additionally includes an annular seating surface 705 that engages the valve seat 707 when the valve element 704 is in the closed position.

Unlike the other embodiments, the valve body additionally includes a spring element cavity 714, an altitude compensator cavity 716, and a stroke limiter cavity 718 formed therein, all of which are in fluid communication with ambient fluid pressure. The spring element cavity 714 has a spring element 722 and a piston 723 is disposed therein. The spring element 722 engages the valve body 702 and the valve element 704 and supplies a bias force to the valve element 704 that biases the valve element 704 toward the full-open position. The piston 723 is coupled to the valve element 704 and is movably disposed within the spring element cavity 714. The piston 723 has an annular sealing surface 715 that is of the same diameter as the annular seating surface 705. A primary seal 723 that is coupled to the valve element 704, and more specifically to the piston 723, is also disposed within the spring element cavity 714. The primary seal 723 isolates fluid pressure in the outlet cavity 713 from ambient fluid pressure in the spring element cavity 714.

The altitude compensator cavity 716 has an altitude compensator 724 disposed therein. The altitude compensator 724 comprises an altitude compensator bellows 728 that is coupled to the valve body 702 and the valve element 704. The altitude compensator bellows 728 is configured, in response to ambient pressure, to vary the fluid pressure at which the valve element 704 moves to the closed and open positions.

The stroke limiter cavity 718 has a stroke limiter 726 disposed therein. The stroke limiter 726 comprises a stroke limiter bellows 732 that is coupled to the valve body 704. The stroke limiter bellows 732 is configured, in response to ambient pressure, to vary the full-open position of the valve element 704. A secondary seal 725 that is also coupled to the valve element 704 is disposed within the stroke limiter cavity 718. The secondary seal 725 isolates fluid pressure in the inlet cavity 711 from ambient fluid pressure.

With this embodiment, as fluid pressure at the inlet port 706 increases, a net force acts on the valve element 704 in the closing direction. This force is equivalent to the area of the annular seating surface 705 (or the annular sealing surface 715, since these have the same diameter) minus the area of secondary seal 725, multiplied by the inlet gage pressure ($P_{inlet}-P_{ambient}$). When the net force equals the net spring preload force, a force balance is achieved and the valve element begins to move toward the closed position. When the inlet pressure increases to a sufficient level, the valve element 704 fully seats, blocking outlet flow. As inlet pressure decreases, the valve element 704 will translate to the full-open position over an operating pressure range similar to that of closing, minus hysteresis and friction effects.

The altitude compensator bellows 728 acts to bias the valve element 704 closing and opening pressure as a function of altitude. As altitude increases, absolute ambient pressure is reduced, resulting in additional force output from the bellows 728 for a given installed height. This force counteracts the compression spring force, resulting in a reduction of the closing and opening pressure characteristic of the valve element 704.

The stroke limiter evacuated bellows 732 is relatively stiff and is not significantly affected by the net forces imposed by the altitude compensator bellows 728 and the compression spring 727. The stroke limiter bellows 732 limits full open stroke of the valve element only. It is configured to restrict the valve element to the closed position at a predetermined altitude, and allows full valve element travel at sea level conditions.

The pressure and flow altitude compensated shutoff valves described herein are configured so that the full-open position limits and the open/close switch points vary with altitude. More specifically, the full-open position limits and the open/close switch points both decrease with increasing altitude. It is noted that the embodiments depicted in FIGS. 1-6 are relatively better than the embodiment depicted in FIG. 7 for high pressure applications, but with some added complexity. Although the embodiment depicted in FIG. 7 is relatively simpler, it grows quickly in weight and volume as operational pressure increases.

Figure 8:
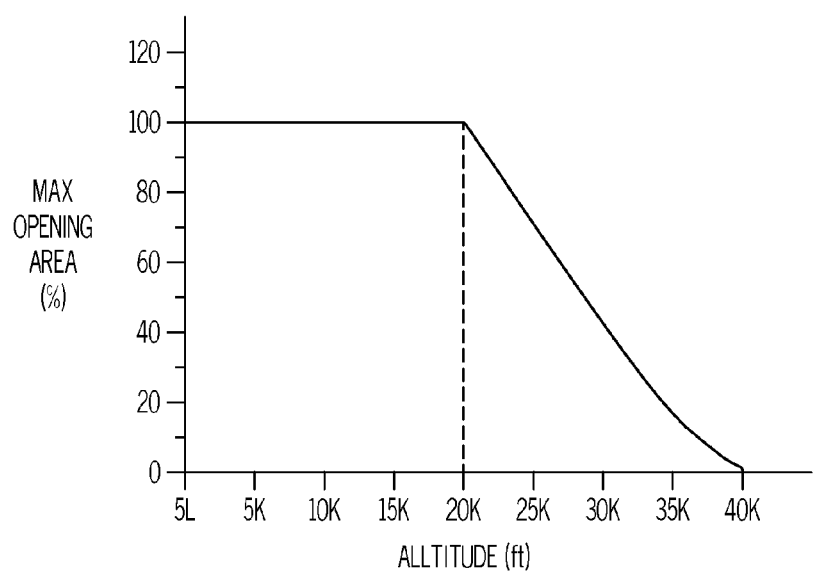
FIG. 8 depicts an exemplary graph of the full-open position limit versus altitude for the valve depicted in FIG. 1.
Figure 9:
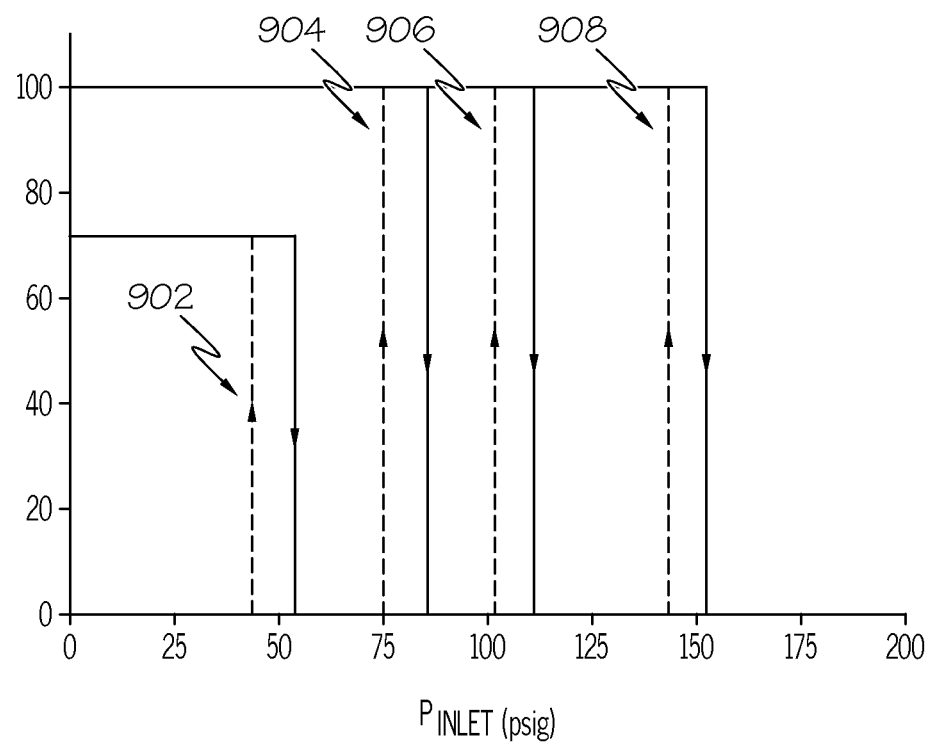
FIG. 9 depicts an exemplary graph of closing and opening characteristics at various altitudes for the valve depicted in FIG. 1.

The specific characteristics of each valve embodiment may vary, but exemplary characteristics for the valve 100 depicted in FIGS. 1-3 are graphically depicted in FIGS. 8 and 9. In particular, FIG. 8 depicts an exemplary graph of the full-open position limit versus altitude, and FIG. 9 depicts an exemplary graph of open/close switch points at various altitudes. It is emphasized that the values represented in these graphs are merely exemplary of one particular configuration, and may vary from valve to valve, as needed or desired.

As illustrated in FIG. 8, the depicted valve 100 is configured such that its full-open position represents 100% of the maximum opening area when the reference pressure source 164 is at pressures equivalent to altitudes of 20,000 feet or less. However, when reference pressure source 164 is at pressures equivalent to altitudes greater than 20,000 feet, its full-open position represents <100% of the maximum opening area. The maximum opening area decreases to 0% for altitudes of 40,000 feet or above, which means the valve 100 will remain closed at these altitudes.

The characteristics depicted in FIG. 8 are reflected in the graphs depicted in FIG. 9, which depicts the open/close switch points of the same valve at four different altitudes. In particular, FIG. 9 graphically depicts the open/close switch points for this valve 100 at altitudes of 25,000 feet (902), 15,000 feet (904), 8,000 feet (906), and sea level (908). At an altitude of 25,000 feet, the depicted valve 100 will be closed when the fluid pressure at the inlet 112 reaches 53 psig, and will return to the full-open position when the fluid pressure subsequently decreases to 44 psig; at an altitude of 15,000 feet, the depicted valve 100 will be closed when the fluid pressure at the inlet 112 reaches 84 psig, and will return to the full-open position when the fluid pressure subsequently decreases to 75 psig; at an altitude of 8,000 feet, the depicted valve 100 will be closed when the fluid pressure at the inlet 112 reaches 112 psig, and will return to the full-open position when the fluid pressure subsequently decreases to 103 psig; and at sea level, the depicted valve 100 will be closed when the fluid pressure at the inlet 112 reaches 153 psig, and will return to the full-open position when the fluid pressure subsequently decreases to 144 psig.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A valve, comprising:
   a valve body having an inlet port, an outlet port, and a flow passage extending between the inlet port and the outlet port;
   a valve element disposed within the flow passage and responsive to fluid pressure at the inlet port to move between a closed position, in which fluid does not flow through the flow passage, and a plurality of open positions between the closed position and a full-open position;
   an altitude compensation pilot valve coupled to the valve body and including at least a first port, a second port, and a third port, the first port in fluid communication with the inlet port, the second port adapted to be in fluid communication with a reference pressure source, the third port in fluid communication with the main piston cavity, the altitude compensation pilot valve responsive to pressure variations at the second port to control the fluid pressure at which the valve element moves to the closed and open positions; and
   a main piston cavity formed in the valve body and in fluid communication with the altitude compensation pilot valve, the piston cavity having a first portion of the valve element disposed therein,
   wherein:
      the altitude compensation pilot valve further includes a third port that is in fluid communication with the main piston cavity, and
      the altitude compensation pilot valve is responsive to pressure variations at the second port to selectively place the main piston cavity in fluid communication with one of the inlet port or the second port.

2. The valve of claim 1, wherein the altitude compensation pilot valve comprises:
   a compensation piston cavity formed in the valve body, the compensation piston cavity in fluid communication with the first port and including a fourth port that is adapted to be in fluid communication with the reference pressure source;
   a compensation piston disposed within the compensation piston cavity and movable therein in response to a difference in fluid pressure between the first port and the fourth port; and
   a pilot valve element coupled to the compensation piston and movable therewith between an equalization position, in which the third port is in fluid communication with the first port and is fluidly isolated from the second port, and a vent position, in which the third port is in fluid communication with the second port and is fluidly isolated from the first port.

3. The valve of claim 2, wherein the altitude compensation pilot valve further comprises an evacuated bellows coupled to the valve body and responsive to pressure variations of the reference pressure source to selectively move the pilot valve element between the equalization and vent positions.

4. The valve of claim 2, wherein the altitude compensation pilot valve further comprises a compensation spring element disposed within the compensation piston cavity and supplying a bias force to the compensation piston that biases the pilot valve element toward the equalization position.

5. The valve of claim 1, further comprising:
a main spring element disposed within the main piston cavity and supplying a bias force to the valve element that biases the valve element toward the full-open position.

6. The valve element of claim 5, further comprising:
a valve seat extending into the flow passage and dividing the flow passage into an inlet cavity and an outlet cavity;
a primary seal coupled to a first portion of the valve element, the primary seal disposed within and engaging the main piston cavity;
a secondary seal retainer formed in the valve body and spaced apart from the main piston cavity; and
a secondary seal surrounding a second portion the valve element and disposed within the secondary seal retainer.

7. The valve of claim 6, wherein:
the valve element includes an annular seating surface that engages the valve seat when the valve is in the closed position, the annular seating surface having a first diameter;
the first portion of the valve element comprises a piston coupled to the valve element and movably disposed within the main piston cavity, the piston including an annular sealing surface having the first diameter; and
the second portion of the valve element having a second diameter that is less than the first diameter.

8. The valve of claim 1, further comprising:
a stroke limiter coupled to the valve body and responsive to pressure variations of the reference pressure source to control the full-open position of the valve element.

9. The valve of claim 8, further comprising:
a stroke limiter cavity formed in the valve body, the stroke limiter cavity having a second portion of the valve element and the stroke limiter disposed therein, the stroke limiter cavity in fluid communication with the reference pressure source; and
a channel formed in and extending through the valve element, the channel including a first valve element port and a second valve element port, the first valve element port in fluid communication with the main piston cavity, the second valve element port in fluid communication with the stroke limiter cavity.

10. The valve of claim 9, wherein the stroke limiter comprises:
a stroke limiting relief valve disposed within the channel proximate the second port and movable between a first position, in which the stroke limiter cavity is fluidly isolated from the main piston cavity, and a second position, in which the stroke limiter cavity is in fluid communication with the main piston cavity; and
an evacuated bellows responsive to pressure variations of the reference pressure source to selectively move the stroke limiting relief valve between the first and second positions.

11. A valve, comprising:
a valve body having an inlet port, an outlet port, and a flow passage extending between the inlet port and the outlet port;
a valve element disposed within the flow passage and responsive to fluid pressure at the inlet port to move between a closed position, in which fluid does not flow through the flow passage, and a plurality of open positions between the closed position and a full-open position;
an altitude compensation pilot valve coupled to the valve body and including at least a first port and a second port, the first port in fluid communication with the inlet port, the second port adapted to be in fluid communication with a reference pressure source, the altitude compensation pilot valve responsive to pressure variations at the second port to control the fluid pressure at which the valve element moves to the closed and open positions; and
a stroke limiter coupled to the valve body and responsive to pressure variations of the reference pressure source to control the full-open position of the valve element.

12. The valve of claim 11, further comprising:
a main piston cavity formed in the valve body and in fluid communication with the altitude compensation pilot valve, the piston cavity having a portion of the valve element disposed therein;
a main spring element disposed within the main piston cavity and supplying a bias force to the valve element that biases the valve element toward the full-open position;
a valve seat extending into the flow passage and dividing the flow passage into an inlet cavity and an outlet cavity;
a primary seal coupled to a first portion of the valve element, the primary seal disposed within and engaging the main piston cavity;
a secondary seal retainer formed in the valve body and spaced apart from the main piston cavity; and
a secondary seal surrounding a second portion the valve element and disposed within the secondary seal retainer, wherein:
the valve element includes an annular seating surface that engages the valve seat when the valve is in the closed position, the annular seating surface having a first diameter;
the first portion of the valve element comprises a piston coupled to the valve element and movably disposed within the main piston cavity, the piston including an annular sealing surface having the first diameter; and
the second portion of the valve element having a second diameter that is less than the first diameter.

13. The valve of claim 12, wherein the altitude compensation pilot valve comprises:
a third port that is in fluid communication with the main piston cavity;
a compensation piston cavity formed in the valve body, the compensation piston cavity in fluid communication with the first port and including a fourth port that is adapted to be in fluid communication with the reference pressure source;
a compensation piston disposed within the compensation piston cavity and movable therein in response to a difference in fluid pressure between the first port and the fourth port;
a pilot valve element coupled to the compensation piston and movable therewith between an equalization position, in which the third port is in fluid communication with the first port and is fluidly isolated from the second port, and a vent position, in which the third port is in fluid communication with the second port and is fluidly isolated from the first port;
a compensation spring element disposed within the compensation piston cavity and supplying a bias force to the compensation piston that biases the pilot valve element toward the equalization position; and
an evacuated bellows coupled to the valve body and responsive to pressure variations of the reference pressure source to selectively move the pilot valve element between the equalization and vent positions.

14. The valve element of claim 13, further comprising:
a spring element cavity formed in the valve body and having the spring element disposed therein, the spring element cavity in fluid communication with ambient fluid pressure;
an altitude compensator cavity formed in the valve body and having the altitude compensator disposed therein, the altitude compensator cavity in fluid communication with ambient fluid pressure; and
a stroke limiter cavity formed in the valve body and having the stroke limiter disposed therein, the stroke limiter cavity in fluid communication with ambient fluid pressure.

15. The valve of claim 12, further comprising:
a stroke limiter cavity formed in the valve body, the stroke limiter cavity having a second portion of the valve element and the stroke limiter disposed therein, the stroke limiter cavity in fluid communication with the reference pressure source; and
a channel formed in and extending through the valve element, the channel including a first valve element port and a second valve element port, the first valve element port in fluid communication with the main piston cavity, the second valve element port in fluid communication with the stroke limiter cavity.

16. The valve of claim 15, wherein the stroke limiter comprises:
a stroke limiting relief valve disposed within the channel proximate the second port and movable between a first position, in which the stroke limiter cavity is fluidly isolated from the main piston cavity, and a second position, in which the stroke limiter cavity is in fluid communication with the main piston cavity; and
an evacuated bellows responsive to pressure variations of the reference pressure source to selectively move the stroke limiting relief valve between the first and second positions.

17. The valve element of claim 15, further comprising:
a valve seat extending into the flow passage and dividing the flow passage into an inlet cavity and an outlet cavity;
a primary seal coupled to the valve element and disposed within the spring element cavity, the primary seal isolating fluid pressure in the outlet cavity from ambient fluid pressure in the spring element cavity; and
a secondary seal coupled to the valve element and disposed within the stroke limiter cavity, the secondary seal isolating fluid pressure in the inlet cavity from ambient fluid pressure, wherein:
the valve element has an annular seating surface that engages the valve seat when the valve is in the closed position;
the annular seating surface has a first diameter;
the valve further comprises a piston coupled to the valve element and movably disposed within the spring element cavity;
the piston has an annular sealing surface; and
the annular sealing surface has the first diameter.

18. A valve, comprising:
a valve body having an inlet port, an outlet port, and a flow passage extending between the inlet port and the outlet port;
a valve element disposed within the flow passage and responsive to fluid pressure at the inlet port to move between a closed position, in which fluid does not flow through the flow passage, and a plurality of open positions between the closed position and a full-open position;
a spring element engaging the valve body and the valve element and supplying a bias force to the valve element that biases the valve element toward the full-open position;
an altitude compensator bellows coupled to the valve body and the valve element and configured, in response to ambient pressure, to vary the fluid pressure at which the valve element moves to the closed and open positions; and
a stroke limiter bellows coupled to the valve body and configured, in response to ambient pressure, to vary the full-open position of the valve element.

\* \* \* \* \*